United States Patent
Choi et al.

(10) Patent No.: US 10,306,612 B2
(45) Date of Patent: May 28, 2019

(54) METHOD AND APPARATUS FOR TRANSMITTING CONTROL CHANNEL IN INTRA-CELL CARRIER AGGREGATION SYSTEM

(71) Applicant: Samsung Electronics Co., Ltd., Suwon-si, Gyeonggi-do (KR)

(72) Inventors: Seunghoon Choi, Suwon-si (KR); Youngbum Kim, Seoul (KR); Jinyoung Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 14/927,957

(22) Filed: Oct. 30, 2015

(65) Prior Publication Data
US 2016/0128034 A1    May 5, 2016

Related U.S. Application Data

(60) Provisional application No. 62/073,163, filed on Oct. 31, 2014.

(51) Int. Cl.
  *H04L 1/18* (2006.01)
  *H04L 5/00* (2006.01)
  *H04W 72/04* (2009.01)

(52) U.S. Cl.
  CPC ......... *H04W 72/042* (2013.01); *H04L 1/1864* (2013.01); *H04L 5/00* (2013.01); *H04L 5/001* (2013.01); *H04L 5/0055* (2013.01)

(58) Field of Classification Search
  CPC ... H04L 5/0055; H04L 1/1812; H04L 1/1864; H04L 1/1896; H04L 5/00; H04W 72/042
  See application file for complete search history.

(56) References Cited

U.S. PATENT DOCUMENTS

2012/0287828 A1   11/2012   Chen et al.
2013/0070660 A1    3/2013   Xu
(Continued)

FOREIGN PATENT DOCUMENTS

| EP | 2 824 862 A2 | 1/2015 |
|---|---|---|
| KR | 10-2014-0108393 A | 9/2014 |
| KR | 10-2015-0048615 A | 5/2015 |

OTHER PUBLICATIONS

LG Electronics et al., 'CR on HARQ-ACK transmission for TDD-FDD CA with eIMTA', R1-144511, 3GPP TSG-RAN WG1 Meeting #78bis, Ljubljana, Slovenia, Oct. 6-10, 2014.
(Continued)

*Primary Examiner* — Noel R Beharry
*Assistant Examiner* — Nicole King
(74) *Attorney, Agent, or Firm* — Jefferson IP Law, LLP

(57) ABSTRACT

A technique for converging 5$^{th}$ Generation (5G) communication and Internet of Things (IoT) technologies is provided. The technique may be applied to intelligent services based on the 5G communication and IoT technologies. Further, a method by a terminal in a communication system is provided that includes receiving configuration information including information on an uplink control channel format, receiving downlink data on at least one of a first subframe of a primary cell and a first subframe of a secondary cell, and transmitting a response corresponding to the downlink data on a second subframe of the primary cell based on the configuration information and the first subframe of a secondary cell. According to the method, data may be transmitted/received through the cells operating in the different duplex modes simultaneously and an uplink control format optimized for uplink control channel transmission may be used, resulting in improvement of uplink resource utilization efficiency.

20 Claims, 11 Drawing Sheets

(56) References Cited

U.S. PATENT DOCUMENTS

| | | |
|---|---|---|
| 2013/0170357 A1 | 7/2013 | Anchan et al. |
| 2013/0294320 A1 | 11/2013 | Jactat et al. |
| 2013/0343239 A1* | 12/2013 | Damnjanovic ......... H04L 5/001 370/280 |
| 2014/0029484 A1* | 1/2014 | Choi ..................... H04J 3/1694 370/280 |
| 2014/0185539 A1 | 7/2014 | Seo et al. |
| 2014/0233452 A1 | 8/2014 | Kim et al. |
| 2014/0241220 A1 | 8/2014 | Choi et al. |
| 2014/0269519 A1 | 9/2014 | Shan et al. |
| 2014/0348050 A1 | 11/2014 | Kim et al. |
| 2014/0369242 A1* | 12/2014 | Ng .................... H04W 72/0453 370/280 |
| 2015/0124670 A1* | 5/2015 | Park ..................... H04L 1/1671 370/281 |
| 2015/0146588 A1* | 5/2015 | Park ..................... H04L 5/0055 370/280 |
| 2015/0180676 A1 | 6/2015 | Bao et al. |
| 2015/0200752 A1* | 7/2015 | Yin ..................... H04L 1/1887 370/280 |
| 2015/0215903 A1 | 7/2015 | Zhao et al. |
| 2016/0157081 A1 | 6/2016 | Kwak et al. |
| 2016/0242065 A1 | 8/2016 | Fukuta et al. |
| 2016/0242152 A1 | 8/2016 | Yu et al. |
| 2016/0242158 A1* | 8/2016 | Takeda .................. H04L 1/1854 |
| 2016/0269885 A1 | 9/2016 | Kim et al. |
| 2016/0323846 A1 | 11/2016 | Park et al. |
| 2016/0374050 A1 | 12/2016 | Prasad et al. |
| 2017/0238149 A1 | 8/2017 | Xu et al. |
| 2017/0251341 A1 | 8/2017 | Frost et al. |

OTHER PUBLICATIONS

LG Electronics, Considerations on HARQ-ACK and DCI for TDD-FDD CA, 3GPP TSG RAN WG1 Meeting #75, R1-135464, XP050735137, Nov. 13, 2013, San Francisco, USA.

LG Electronics, UCI for TDD-FDD carrier aggregation, 3GPP TSG RAN WG1 Meeting #76, R1-140313, XP050735863, Feb. 9, 2014, Prague, Czech Republic.

Motorola Solutions, Background on RP-141035 Group Call eMBMS Congestion Management, 3GPP TSG-RAN WG3 #85, R3-141836, Dresden, Germany, Aug. 18-22, 2014.

New Work Item: Group Call eMBMS congestion management, 3GPP TSG RAN Meeting #64, RP-141035, Sophia Antipolis, France, Jun. 10-13, 2014.

* cited by examiner

METHOD AND APPARATUS FOR TRANSMITTING CONTROL CHANNEL IN INTRA-CELL CARRIER AGGREGATION SYSTEM

CROSS-REFERENCE TO RELATED APPLICATION(S)

This application claims the benefit under 35 U.S.C. § 119(e) of a U.S. Provisional application filed on Oct. 31, 2014 in the U.S. Patent and Trademark Office and assigned Ser. No. 62/073,163, the entire disclosure of which is hereby incorporated by reference.

TECHNICAL FIELD

The present disclosure relates to a method and apparatus for transmitting/receiving signals in a mobile communication system. More particularly, the present disclosure relates to a control channel transmission method and apparatus for use in an intra-cell carrier aggregation system.

BACKGROUND

To meet the demand for wireless data traffic having increased since deployment of $4^{th}$ generation (4G) communication systems, efforts have been made to develop an improved $5^{th}$ generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

The LTE-advanced (LTE-A) of the $3^{rd}$ generation partnership project (3GPP) is a technology for realizing high-speed packet-based communications at the data rate of up to 100 Mbps. In the LTE-A, the number of cells serving a user equipment (UE) increases while feedback for all of the serving cells are transmitted through a primary cell (PCell). Also, in LTE-A, all of the cells serving one UE operate in the same duplex mode. Accordingly, all of the cells may operate in the frequency division duplex (FDD) mode or time division duplex (TDD) mode. Among them, the TDD mode can be categorized into one of the static TDD mode in which the uplink (UL)-downlink (DL) configuration is maintained and the dynamic TDD mode in which the UL-DL configuration varies by means of the system information, higher layer signal, or DL common control channel.

In the case where a cell under the control of the evolved node B (eNB) operates in the FDD mode and one frequency band is added, it is easy to adopt the TDD mode to the added frequency. This is because the FDD mode requires two frequency bands for DL and UL respectively.

In the case where there are cells operating in different duplex modes due to the addition of a restrictive frequency as aforementioned or other reasons, a method for transmitting the control channel corresponding to the data transmitted through multiple cells is required. In the case where feedback carrying the UL control channels associated with multiple cells in correspondence to the DL data are transmitted through only the PCell, there is a need of a technique for the UE to transmit the feedback for the cells having different frame structures through the PCell. Also, there is a need of a technique for the eNB to schedule the UL transmission of the UE in association with the DL control channel corresponding to the UL data and to transmit the DL control channel corresponding to the UL data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting/receiving signals in a mobile communication system.

In accordance with an aspect of the present disclosure, a method by a terminal in a communication system is provided. The method includes receiving configuration information including information on an uplink (UL) control channel format, receiving downlink (DL) data on at least one of a first subframe of a primary cell and a first subframe of a secondary cell, and transmitting a response corresponding to the DL data on a second subframe of the primary cell based on the configuration information and the first subframe of the secondary cell.

In accordance with another aspect of the present disclosure, a method by a base station in a communication system is provided. The method includes transmitting configuration information including information on a UL control channel format, transmitting DL data on at least one of a first subframe of a primary cell and a first subframe of a secondary cell, and receiving a response corresponding to the DL data on a second subframe of the primary cell based on the configuration information and the first subframe of the secondary cell.

In accordance with another aspect of the present disclosure, a terminal in a communication system is provided. The terminal includes a transceiver configured to transmit a signal and to receive another signal and a controller configured to receive configuration information including information on a UL control channel format, to receive DL data on at least one of a first subframe of a primary cell and a first subframe of a secondary cell, and transmit a response corresponding to the DL data on a second subframe of the primary cell based on the configuration information and the first subframe of the secondary cell.

In accordance with another aspect of the present disclosure, a base station in a communication system is provided. The base station includes a transceiver configured to transmit a signal and to receive another signal and a controller configured to transmit configuration information including information on a UL control channel format, to transmit DL data on at least one of a first subframe of a primary cell and a first subframe of a secondary cell, and to receive a response corresponding to the DL data on a second subframe of the primary cell based on the configuration information and the first subframe of the secondary cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
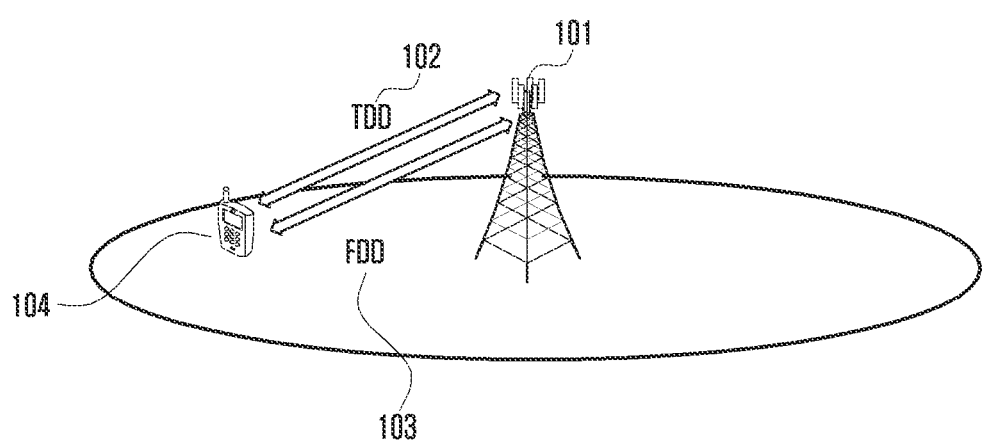
FIGS. 1A and 1B are diagrams illustrating communication systems according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it is understood that each block of flowcharts and the combinations of the flowcharts can be performed by computer program instructions. Since computer program instructions may be mounted in a processor of a universal computer, a special computer or other programmable data processing equipment, instructions performed through a processor of a computer or other programmable data processing equipment generates means for performing functions described in block(s) of the flowcharts. Since the computer program instructions may be stored in a computer available or computer readable memory capable of orienting a computer or other programmable data processing equipment to implement functions in a specific scheme, instructions stored in the computer available or computer readable memory may produce manufacturing articles involving an instruction means executing functions described in block(s) of flowcharts. Because the computer program instructions may be mounted on a computer or other programmable data processing equipment, a series of operations are performed in the computer or other programmable data processing equipment to create a process executed by the computer such that instructions performing the computer or other programmable data processing equipment may provide operations for executing functions described in block(s) of flowcharts.

Further, each block may indicate a part of a module, a segment, or a code including at least one executable instruction for executing specific logical function(s). It should be noticed that several execution examples may generate functions described in blocks out of an order. For example, two continuously shown blocks may be simultaneously performed, and the blocks may be performed in a converse order according to corresponding functions.

As used in this embodiment of the present disclosure, the term "~ unit" refers to software or a hardware structural element such as field-programmable gate array (FPGA) or application-specific integrated circuit (ASIC), and the "~ unit" perform some roles. However, the "~ unit" is not limited to software or hardware. The "~ unit" can be configured to be stored in an addressable storage medium and to play at least one processor. Accordingly, for example, the "~ unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "~ units" may be engaged by the smaller number of structural elements and "~ units", or may be divided by additional structural elements and "~ units". Furthermore, structural elements and "~ units" may be implemented to play a device or at least one central processing unit (CPU) in a security multimedia card.

An embodiment of the present disclosure is characterized by applying the uplink (UL) control channel transmission timing of the frequency division duplex (FDD) cell to the transmission of the UL control channel corresponding to the downlink (DL) data of the time division duplex (TDD) cell.

Another embodiment of the present disclosure is characterized by transmitting the UL control channel using the UL control format designed by taking only the UL control information corresponding to the DL data of the FDD cell into consideration when transmitting the UL control channel corresponding to the subframe which cannot carry the DL data in the TDD cell.

The following terms are defined in consideration of the functionality in the present disclosure, and may vary according to the intention of a user or an operator, usage, etc. Therefore, the definition should be made based on the overall content of the present specification.

Although the description is directed to the long term evolution (LTE) and LTE-advanced (LTE-A) system, the present disclosure can be applied to other communication systems using the base station scheduling without modification.

Orthogonal frequency division multiple access (OFDMA) is a multicarrier modulation technique for transmitting data using multiple carriers in such a way of parallelizing symbol streams input in series and modulating the symbols onto orthogonal multiple carriers, i.e. subcarriers channels.

In the orthogonal frequency division multiplexing (OFDM) scheme, the modulation signal is positioned on the 2-dimensional time-frequency resource. The resource is divided into OFDM symbols on the time axis, and they are orthogonal. The resource is divided into subcarriers on the frequency axis, and they are orthogonal. That is, in the OFDM scheme it is possible to indicate one smallest resource unit by designating a specific OFDM symbol on the time axis and one subcarrier on the frequency axis, and this resource unit is referred to as resource element (RE). Different REs are orthogonal even after passing a frequency selective channel and thus signals transmitted on different REs can be received by a receiver without causing interference with each other.

A physical channel is a channel of a physical layer for transmitting a modulation symbol obtained by modulating one or more encoded bit strings. In an OFDMA system, an information string is transmitted by configuring a plurality of physical channels according to the use of the information string or a receiver for receiving the information string. Which RE one physical channel should be located on for transmission should be promised in advance between a transmitter and a receiver, and a rule for the same is referred to as "mapping".

In an OFDM communication system, the DL band is divided into a plurality of resource blocks (RBs), and each physical RB (PRB) consists of 12 subcarriers arranged on the frequency axis and 14 or 12 OFDM symbols arranged on the time axis. Here, the PRB is the basic unit of resource allocation.

The reference signal (RS) is the signal transmitted by the evolved node B (eNB) in order for the user equipment (UE) to estimate channels, and the LTE system has common RS (CRS) and demodulation RS (DMRS) as a dedicated RS.

The CRS is the RS transmitted across the whole DL band such that all UEs can receive for use in configuring feedback information or demodulating the control and data channels. The DMRS is also the RS transmitted across the whole DL band such that a specific UE can receive for use in data channel demodulation and channel estimation but not for use in configuring feedback information. Accordingly, the DMRS is transmitted on the PRB in which the UE is scheduled.

On the time axis, a subframe is divided into two slots, each of 0.5 msec, i.e. the first and second slots. The physical dedicated control channel (PDCCH) transmitted in the control channel region and enhanced PDCCH (ePDCCH) transmitted in the data channel region are distributed on the time axis. This makes it possible to receive and demodulate the control channel signal quickly. The PDCCH regions are positioned across the whole DL band in such a way that a control channel is subdivided into control channel elements distributed in the whole DL band.

There are two UL channels, i.e. control channel (PUCCH) and data channel (physical UL shared channel (PUSCH)), and the acknowledgement channel and other feedback information corresponding to the DL data channel are transmitted, if there is no data channel, through the control channel and, if there is data channel, through the data channel.

Figure 1B:
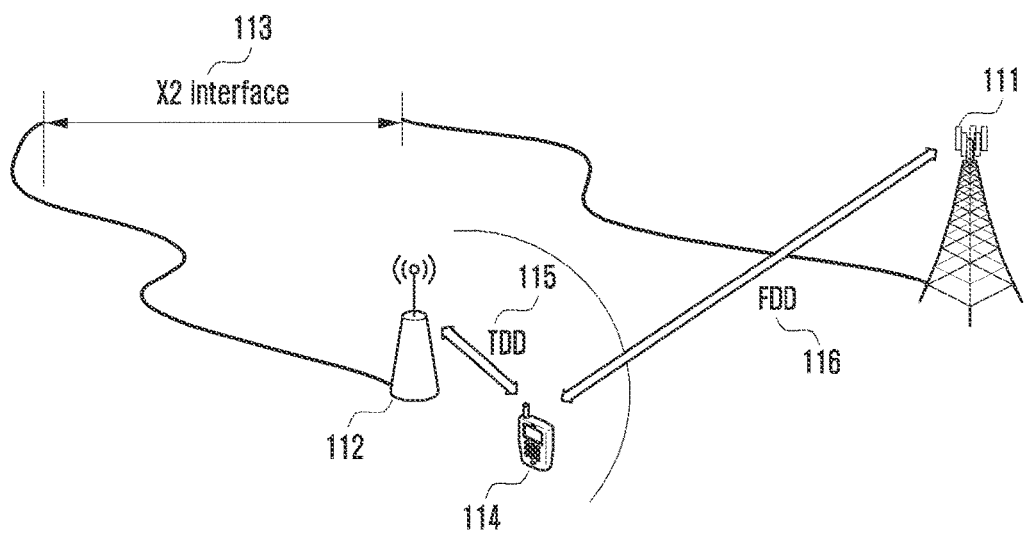

FIGS. 1A and 1B are diagrams illustrating communication systems according to various embodiments of the present disclosure.

FIG. 1A shows the case where a time division duplex (TDD) cell 102 and a frequency division duplex (FDD) cell 103 coexist in network of the eNB 101 and thus a UE 104 communicates data with the eNB through the TDD cell 102 and FDD cell 103. However, the UL transmission is performed through the FDD cell 103 when the FDD cell is the primary cell (PCell). FIG. 1B shows the case where a macro eNB 111 for a large coverage area and a pico eNB 112 for increase of data throughput are deployed and thus the UE 114 communicates data with the macro eNB 111 in the FDD mode 116 and the pico eNB 112 in the TDD mode 115. However, the UL transmission is performed through the macro eNB 111 when the macro eNB is the PCell. It is assumed that the macro eNB 111 and the pico eNB 112 have an ideal backhaul network. This makes it possible for fast inter-eNB communication through the X2 interface 113 and thus the pico eNB 112 can acquire the control information transmitted in UL to the macro eNB through the X2 interface 113 in real time.

Although the method proposed in this description can be applied to both the systems of FIGS. 1A and 1B, the description is mainly made with reference to the system of FIG. 1A.

Figure 2A:
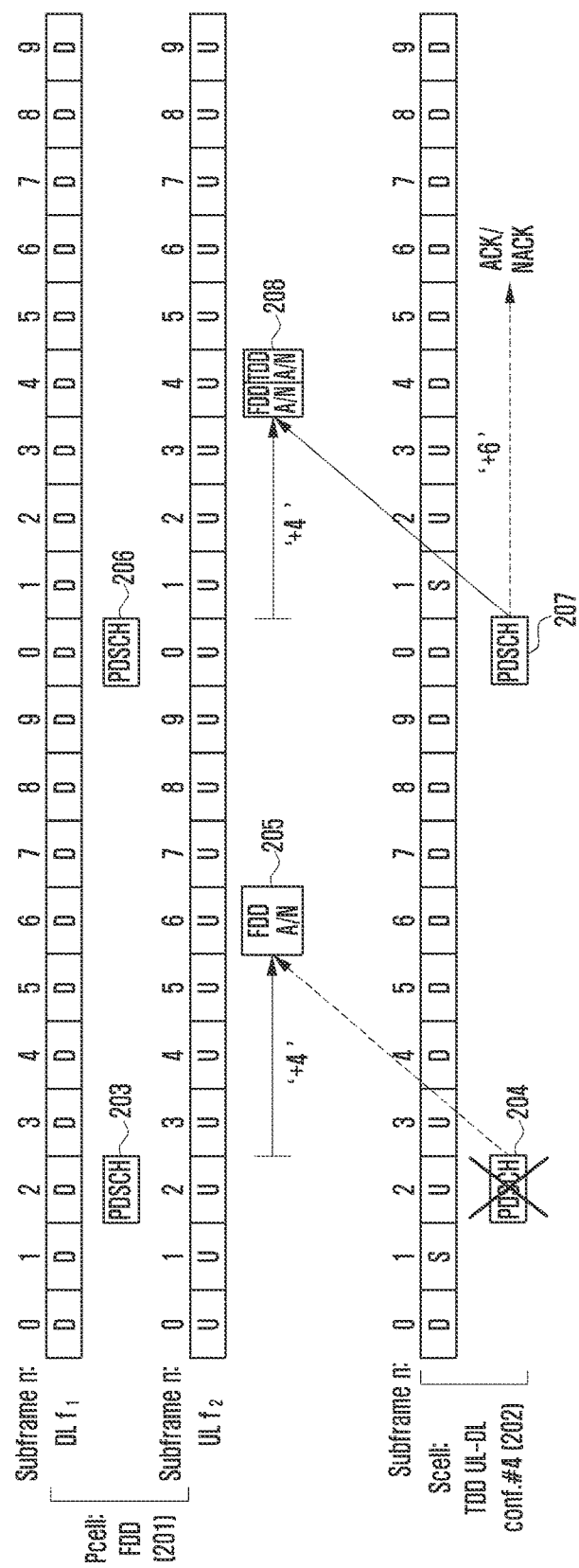
FIGS. 2A, 2B, and 2C are diagrams illustrating control channel transmission methods according to various embodiments of the present disclosure.
Figure 2B:
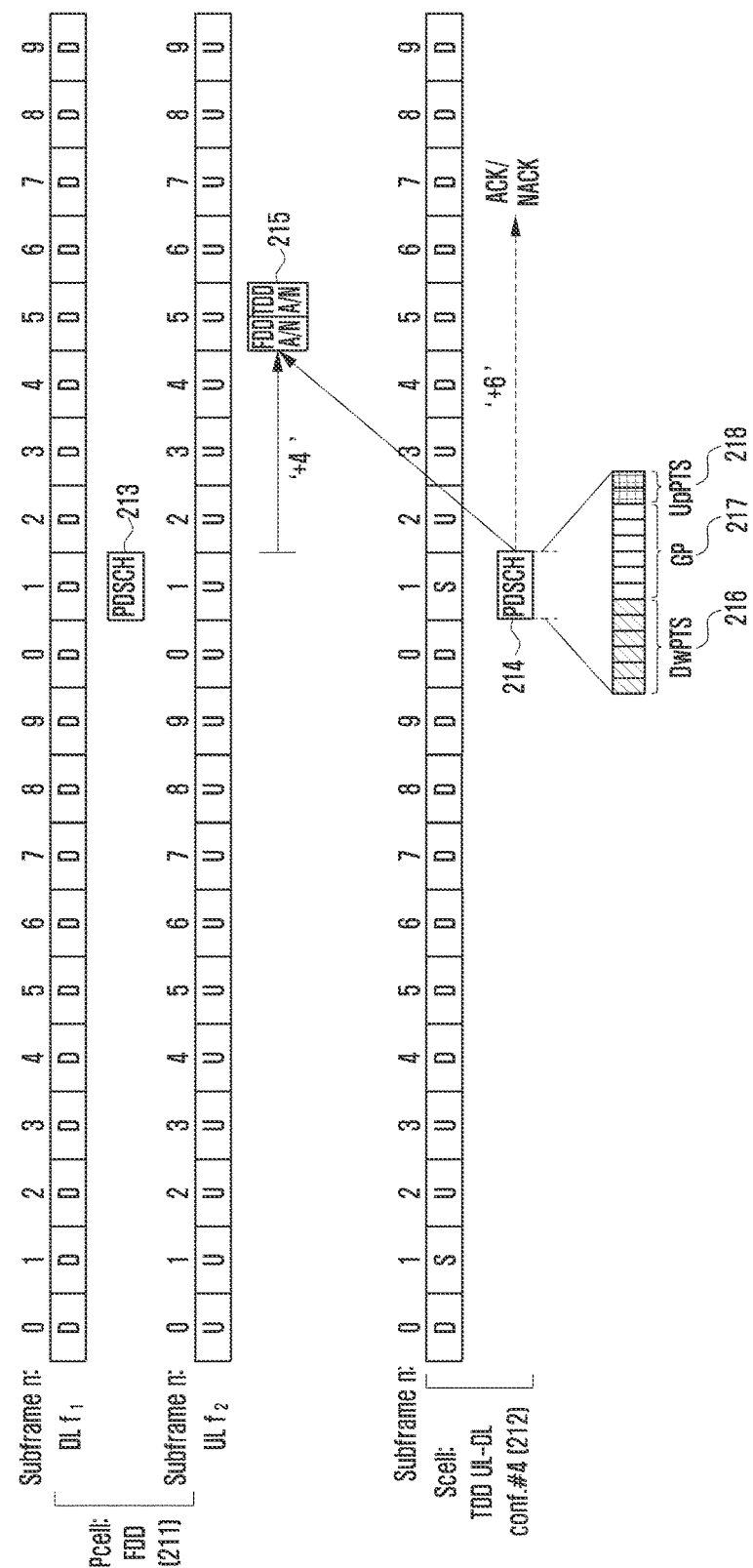
Figure 2C:
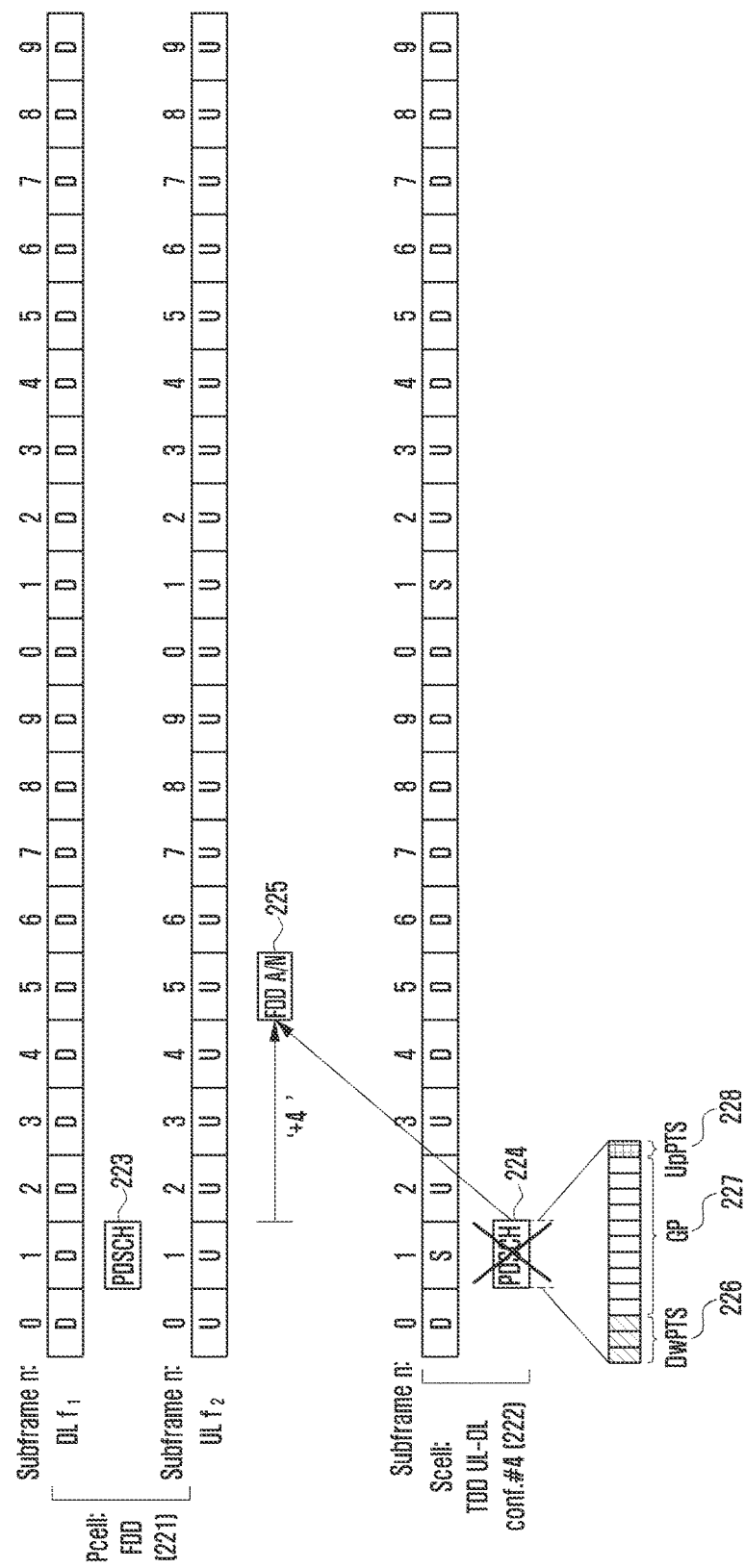

FIGS. 2A, 2B, and 2C are diagrams illustrating control channel transmission methods according to various embodiments of the present disclosure. Descriptions are made of the first and second embodiments of transmitting a UL control channel corresponding to the DL data through the TDD and FDD cells by applying the UL control channel transmission timing of the FDD cell.

FIG. 2A shows UL channel transmission according to the first embodiment of the present disclosure, in the situation where two cells operating in different duplex modes coexist.

Referring to FIG. 2A, the PCell operates in the FDD mode (referred to as FDD cell 201) with the DL frequency f1 and UL frequency f2. The secondary cell (SCell) operates in the static TDD mode (referred to as TDD cell 202) with the DL and UL subframes set according to the TDD UL-DL configuration #4. The TDD UL-DL configuration is for explaining this embodiment, but the technical features according to various embodiments of the present disclosure can be applied to the case where any of other configuration is adopted. The UE may acquire the DL frequency of the PCell through the cell search process and the UL frequency f2 of the PCell from the system information of the eNB. The UE also may acquire the TDD UL-DL configuration for the SCell from higher layer information.

A description is made of the case where the UE transmits hybrid automatic repeat request acknowledgement (HARQ-ACK) in the PUCCH format 1b with channel selection when total two cells, i.e. the PCell and SCell, are configured to the UE and the PUCCH format 1b with channel selection is configured by a higher layer signal. If the physical downlink shared channel (PDSCH) 207 is scheduled in the subframe #0 of the static TDD cell 202, the HARQ-ACK corresponding to the PDSCH 207 is transmitted at the UL subframe #4 of the frequency f2 of the FDD cell after 4 subframes according to the UL control channel transmission timing of the FDD cell. According to the technology of the related art, the HARQ-ACK corresponding to the PDSCH 207 is transmitted at the UL subframe #6 after 6 subframes in the TDD UL-DL configuration #4. At this time, if the PDSCH 206 is scheduled in the subframe #0 of the FDD cell 201, the HARQ-ACK corresponding to the PDSCH 206 is transmitted at the UL subframe #4 on the frequency f2 of the FDD cell 201 after 4 subframes along with the HARQ-ACK corresponding to the PDSCH 207 using the PUCCH format 1b with channel selection as denoted by reference number 208.

If the PDSCH 203 of the FDD cell 201 is scheduled at subframe #2, the HARQ-ACK corresponding to the PDSCH 203 is transmitted at the UL subframe #6 after 4 subframes. At this time, the PDSCH 204 of the static TDD cell 202 cannot be scheduled because the subframe #2 of the static TDD cell 202 is UL. Thus, the UL subframe #6 of the frequency f2 of the FDD cell 201 carries only the HARQ-ACK corresponding to the PDSCH 203 of the FDD cell 201 in the PUCCH format 1a/1b as denoted by reference number 205.

At this time, there is a difference in comparison to the situation where only FDD cells or TDD cells exist. In a situation where only two FDD cells or only two TDD cells exist, the UL control channels have to be transmitted in the same UL control channel format at every UL subframe. In LTE Rel A0, if the use of format 1b with channel selection is configured, the UL control channel is always transmitted in the format 1b with channel selection regardless of PDSCH scheduling in every UL subframe. However, since the subframe #2 of the static TDD cell 202 is the UL subframe, it is agreed to use the simple transmission format such as PUCCH format 1a or 1b between the eNB and the UE in a situation where the PDSCH 204 cannot be scheduled and, in this case, the UE transmits the HARQ-ACK in the PUCCH format 1a/1b. This make it possible to reduce the UL control channel reception complexity at the subframe and to use the UL control channel transmission resources configured for the format 1b with channel selection for other purposes, e.g. UL data transmission.

In more detail, the UE may receive the configuration information related to UL control channel format from the eNB and DL data in at least one of first frames of the primary and secondary cells and transmit the acknowledgement corresponding to the DL data in the secondary subframe of the PCell based on the configuration information and the first subframe of the SCell.

In an embodiment of the present disclosure, the UL control channel format may be the first format, and it may be possible to transmit the acknowledgement corresponding to the DL data received in another format (e.g. the second format) according to the first subframe of the SCell. In an embodiment of the present disclosure, if the first subframe of the SCell is a UL subframe, a special subframe with the normal DL cyclic prefix configuration 0 and 5, or a special subframe with the extended DL cyclic prefix configuration 0 and 4, the UE may transmit the acknowledgement corresponding to the received DL data in the second format; and the first format is a PUCCH and the second format is the PUCCH format 1a/1b.

In an embodiment of the present disclosure, the UL control channel format may be the PUCCH format 3 for which the HARQ-ACK bit may be determined based on the numbers of the serving cells of which the first subframes are DL, the serving cells of which special subframes are not following the normal UL cyclic prefix configurations 0 and 5, and the serving cells of which special subframes are not following the extended cyclic prefix configurations 0 and 4; and the acknowledgement corresponding to the DL data may be transmitted based on the determined HARQ-ACK bit.

Next, a description is made of the case where the UE transmits the HARQ-ACK in the PUCCH format 3 when total two cells, i.e. the PCell and SCell, are configured to the UE and the use of PUCCH format 3 is configured by a higher layer signal. If the PDSCH 207 of the static TDD cell 202 is scheduled in the subframe #0, the HARQ-ACK corresponding to the PDSCH 207 is transmitted at the UL subframe of the frequency f2 of the FDD cell 201 after 4 subframes according to the UL control channel transmission timing of the FDD cell. According to the technology of the related art, the HARQ-ACK corresponding to the PDSCH 207 is transmitted at the UL subframe #6 after 6 subframes in the TDD UL-DL configuration #4. At this time, if the PDSCH 206 is scheduled in the subframe #0 of the FDD cell 201, the HARQ-ACK corresponding to the PDSCH 206 calculated as the payload size along with the HARQ-ACK corresponding to the PDSCH 207 and then transmitted at the UL subframe #4 on the frequency f2 of the FDD cell 201 after 4 subframes using the PUCCH format 3 as denoted by reference number 208.

If the PDSCH 203 of the FDD cell 201 is scheduled in subframe #2, the HARQ-ACK corresponding to the PDSCH 203 is transmitted at the UL subframe #6 of the frequency f2 of the FDD cell 201 after 4 subframes. At this time, the PDSCH 204 of the static TDD cell 202 cannot be scheduled because the subframe #2 of the static TDD cell 202 is the UL subframe. Thus the UL subframe #6 of the frequency f2 of the FDD cell 201 carries only the HARQ-ACK corresponding to the PDSCH 203 of the FDD cell 201 in the PUCCH format 3 as denoted by reference number 205.

At this time, there is a difference in comparison to the situation where only FDD cells or TDD cells exist. In a situation where only two FDD cells or only two TDD cells exist, the HARQ-ACK having the HARQ-ACK payload size calculated by multiplying the number of carriers aggregated and the number of transport blocks (TBs) in accordance with the transmission modes of the cells (however, the bundling window size is further multiplied in the carrier aggregation for TDD cells) is transmitted in the form of the UL control channel in the UL subframe. Accordingly, the HARQ-ACK payload size of the PUCCH format 3 per subframe is not changed. However, in the situation where the PDSCH 204 cannot be scheduled because the subframe #2 of the static TDD cell 202 is the UL subframe, the UE does not apply the HARQ payload size calculated for the HARQ-ACKs corresponding to the PDSCHs that cannot be transmitted in the UL subframe but apply only the payload size calculated for the FDD cell 201 to the PUCCH format 3 and transmits the UL control channel in the PUCCH format 3. Using the PUCCH format 3 to which the HARQ-ACK payload size optimized for the subframe is applied, it is possible to reduce the transmit power of the UE while guaranteeing the reception performance of the eNB.

FIG. 2B shows the UL control channel transmission according to the second embodiment of the present disclosure, in the situation where two cells operating in different duplex modes coexist.

Referring to FIG. 2B, the PCell operates in the FDD mode (referred to as FDD cell 211) with the DL frequency f1 and UL frequency f2. The SCell operates in the static TDD mode (referred to as TDD cell 212) with the DL and UL subframes set according to the TDD UL-DL configuration #4. The UE may acquire the DL frequency of the PCell through the cell search process and the UL frequency f2 of the PCell from the system information of the eNB. The UE may also acquire the TDD UL-DL configuration for the SCell from higher layer information.

A description is made of the case where the UE transmits HARQ-ACK in a PUCCH format 3 or PUCCH format 1b with channel selection when total two cells, i.e. the PCell and SCell, are configured to the UE and the use of PUCCH format 3 or PUCCH format 1b with channel selection is configured by a higher layer signal. If the PDSCH 214 is scheduled in the subframe #1 of the static TDD cell 212, the HARQ-ACK corresponding to the PDSCH 214 is transmitted at the UL subframe #5 of the frequency f2 of the FDD cell 211 after 4 subframes according to the UL control channel transmission timing of the FDD cell. The subframe #1 of the TDD cell 212 is a special subframe consisted of downlink pilot time slot (DwPTS) 216, guard period (GP) 217, uplink pilot time slot (UpPTS) 218. The DwPTS 216 is the duration for succeeding to the DL transmission at the DL subframe (#0) smoothly, the GP 217 is the duration for securing the time necessary for switching radio frequency (RF) from DL to UL, and UpPTS 218 is the duration for starting UL transmission such that the next UL subframe (#2) succeeds to the UL transmission smoothly. The lengths of the DwPTS, GP, and UpPTS on the time axis are defined in the special subframe configuration which is transmitted to the UE through a higher layer signal. The PDSCH 214 may be transmitted at the DwPTS 216. However, it is configured to prohibit transmitting PDSCH when the DwPTS 216 is shorter than 4 OFDM symbols. The reason is that there is no space enough for transmitting PDSCH because the PDCCH transmission may require up to 3 OFDM symbols.

According to the technology of the related art, the HARQ-ACK corresponding to the PDSCH 214 is transmitted at the UL subframe #7 after 6 subframes in the TDD UL-DL configuration #4. At this time, if the PDSCH 213 of the FDD cell 211 is scheduled in the subframe #1, the HARQ-ACK corresponding to the PDSCH 213 is transmitted at the UL subframe #5 on the frequency f2 of the FDD cell 211 after 4 subframes along with the HARQ-ACK corresponding to the PDSCH 214 in the configured PUCCH format as denoted by reference number 215. Since the PDSCHs of the FDD cell and TDD cell may be scheduled simultaneously, the PUCCH format is configured by taking both the PDSCHs in the DL subframes of the FDD and TDD cells into consideration.

FIG. 2C shows the UL control channel transmission according to the third embodiment of the present disclosure, in the situation where two cells operating in different duplex modes coexist.

Referring to FIG. 2C, the PCell operates in the FDD mode (referred to as FDD cell 221) with the DL frequency f1 and UL frequency f2. The SCell operates in the static TDD mode 222 with the DL and UL subframes set according to the TDD UL-DL configuration #4. The UE may acquire the DL frequency of the PCell through the cell search process and the UL frequency f2 of the PCell from the system information of the eNB. The UE may also acquire the TDD UL-DL configuration for the SCell from higher layer information.

A description is made of the case where the UE transmits HARQ-ACK in a PUCCH format 1b with channel selection when total two cells, i.e. the PCell and SCell, are configured to the UE and the use of PUCCH format 1b with channel selection is configured by a higher layer signal.

If the PDSCH 223 of the FDD cell 221 is scheduled in the subframe #1, the HARQ-ACK corresponding to the PDSCH 223 is transmitted at the UL subframe #5 on the frequency f2 of the FDD cell 221 after 4 subframes. At this time, since the subframe #1 of the static TDD cell 222 is a special subframe with DwPTS 226 consisted of 3 OFDM symbols, the PDSCH 224 of the static TDD cell 222 cannot be scheduled in the subframe #1. The lengths of the DwPTS 226, GP 227, and UpPTS 228 on the time axis are defined in the special subframe configuration which is transmitted to the UE through a higher layer signal. Accordingly, the UL subframe #5 on the frequency f2 of the FDD cell 221 may carry only the HARQ-ACK corresponding to the PDSCH 223 of the FDD cell 221 in the PUCCH format 1a/1b as denoted by reference number 225.

At this time, there is a difference in comparison to the situation where only FDD cells or TDD cells exist. In a situation where only two FDD cells or only two TDD cells exist, the UL control channels have to be transmitted in the same UL control channel format at every UL subframe. In LTE Rel A0, if the use of format 1b with channel selection is configured, the UL control channel is always transmitted in the format 1b with channel selection regardless of PDSCH scheduling in every UL subframe. However, since the subframe #1 of the static TDD cell 222 is the UL subframe, it is agreed to use the simple transmission format such as PUCCH format 1a or 1b between the eNB and the UE in a situation where the PDSCH 204 cannot be scheduled and, in this case, the UE transmits the HARQ-ACK in the PUCCH format 1a/1b. This make it possible to reduce the UL control channel reception complexity at the subframe and to use the UL control channel transmission resources configured for the format 1b with channel selection for other purposes, e.g. UL data transmission.

Next, a description is made of the case where the UE transmits the HARQ-ACK in the PUCCH format 3 when total two cells, i.e. the PCell and SCell, are configured to the UE and the use of PUCCH format 3 is configured by a higher layer signal.

If the PDSCH 203 of the FDD cell 201 is scheduled in the subframe #2, the HARQ-ACK corresponding to the PDSCH 203 is transmitted at the UL subframe #5 of the frequency 12 of the FDD cell 221 after 4 subframes. At this time, since the subframe #1 of the static TDD cell 222 is the special subframe with DwPTS 226 consisted of 3 OFDM symbols, the PDSCH 224 of the static TDD cell 222 cannot be scheduled in the subframe #1. The lengths of the DwPTS 226, GP 227, and UpPTS 228 on the time axis are defined in the special subframe configuration which is transmitted to the UE through a higher layer signal. Accordingly, the UL subframe #5 on the frequency 12 of the FDD cell 221 may carry only the HARQ-ACK corresponding to the PDSCH 223 of the FDD cell 221 in the PUCCH format 3 as denoted by reference number 225.

At this time, there is a difference in comparison to the situation where only FDD cells or TDD cells exist. In a situation where only two FDD cells or only two TDD cells exist, the HARQ-ACK having the HARQ-ACK payload size calculated by multiplying the number of carriers aggregated and the number of TBs in accordance with the transmission modes of the cells (however, the bundling window size is further multiplied in the carrier aggregation for TDD cells) is transmitted in the form of the UL control channel in the UL subframe. Accordingly, the HARQ-ACK payload size of the PUCCH format 3 per subframe is not changed. However, in the situation where the PDSCH 204 cannot be scheduled because the subframe #1 of the static TDD cell 222 is the special subframe with the DwPTS 226, the UE does not apply the HARQ payload size calculated for the HARQ-ACKs corresponding to the PDSCHs that cannot be transmitted in the special subframe but apply only the payload size calculated for the FDD cell 221 to the PUCCH format 3 and transmits the UL control channel in the PUCCH format 3. Using the PUCCH format 3 to which the HARQ-ACK payload size optimized for the subframe is applied, it is possible to reduce the transmit power of the UE while guaranteeing the reception performance of the eNB.

Figure 3A:
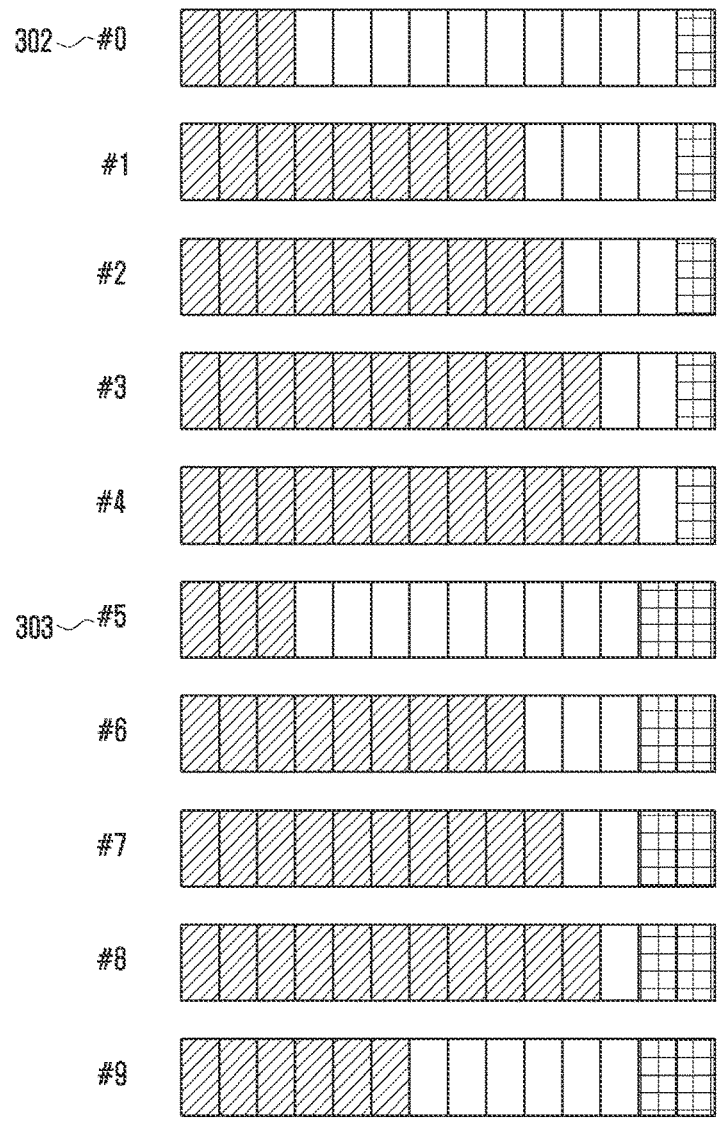
FIGS. 3A and 3B are diagrams illustrating configurations of a special subframe according to various embodiments of the present disclosure.
Figure 3A:
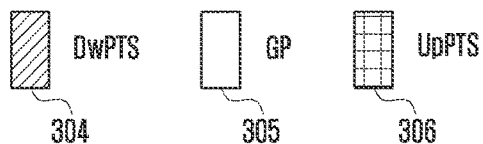
Figure 3B:
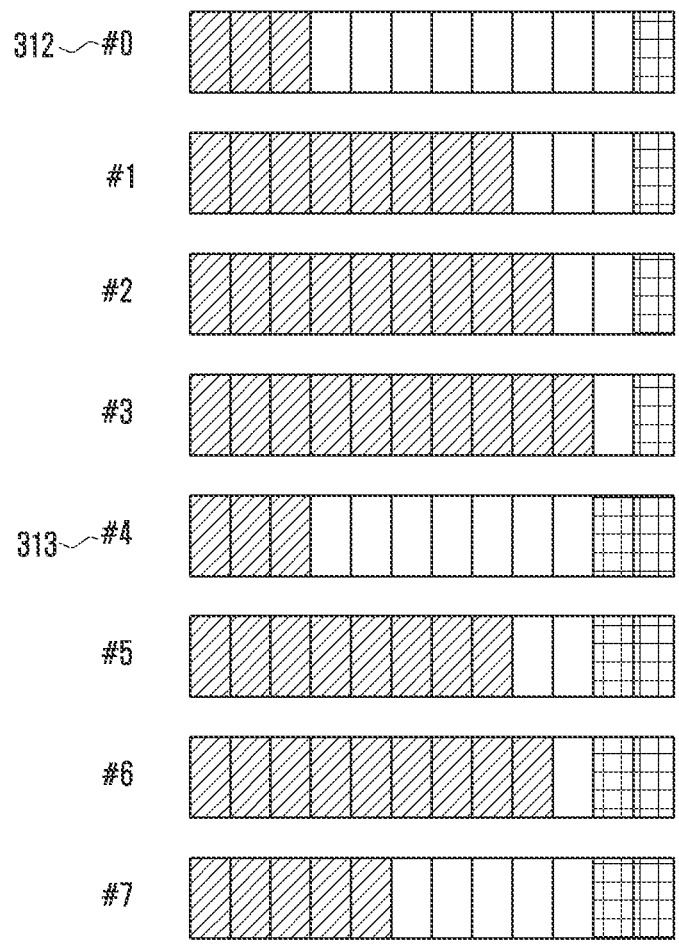

FIGS. 3A and 3B are diagrams illustrating configurations of a special subframe according to various embodiments of the present disclosure.

Referring to FIGS. 3A and 3B, in LTE, 10 special subframe configurations (FIG. 3A) and 8 special subframe configurations (FIG. 3B), which define the lengths of DwPTS 304 and 314, GP 305 and 315, and UpPTS 306 and 316, are specified for the respective cases of using the normal cyclic prefix and extended cyclic prefix in DL. The UE can check whether the DL cyclic prefix is the normal cyclic prefix or the extended cyclic prefix by decoding the synchronization signal received in the serving cell. Among the special subframe configurations 301 for the case of using the normal cyclic prefix in DL, the special subframe configuration #0 302 and special subframe configuration #5 303 have the DwPTS 304 consisted of 3 OFDM symbols which are not enough for transmitting PDSCH. Among the special subframe configurations 311 for the case of using the extended cyclic prefix in DL, the special subframe configuration #0 312 and special subframe configuration #4 313 have the DwPTS 314 consisted of 3 OFDM symbols which are not enough for transmitting PDSCH. Accordingly, if the TDD cell operates with the special subframe configuration #0 302 or the special subframe configuration #5 303 and the normal cyclic prefix in DL, the embodiment of FIG. 2C can be applied; and otherwise if the TDD cell operates with the configuration #0 312 or the special subframe configuration #4 313 and the normal cyclic prefix in DL, the embodiment of FIG. 2C can be applied.

Figure 4A:
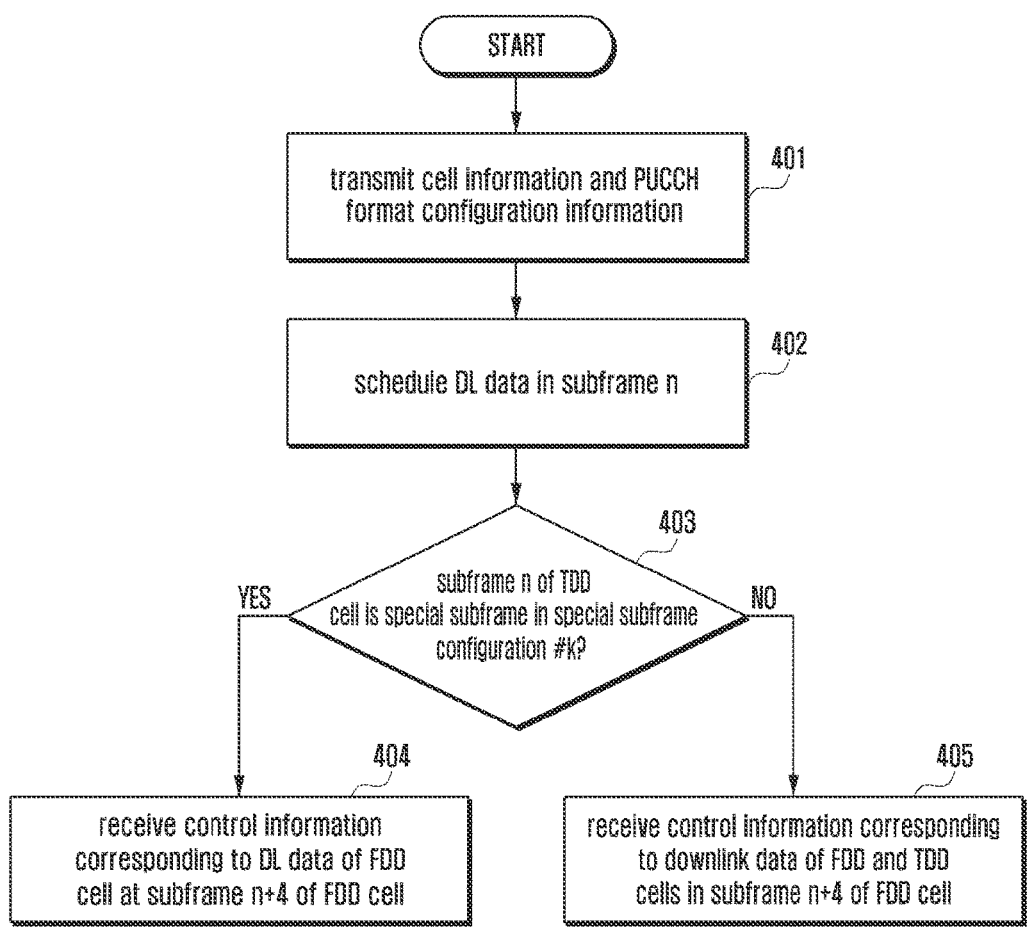
FIGS. 4A and 4B are flowcharts illustrating the operations of the evolved node B (eNB) and the user equipment (UE) according to various embodiments of the present disclosure.
Figure 4B:
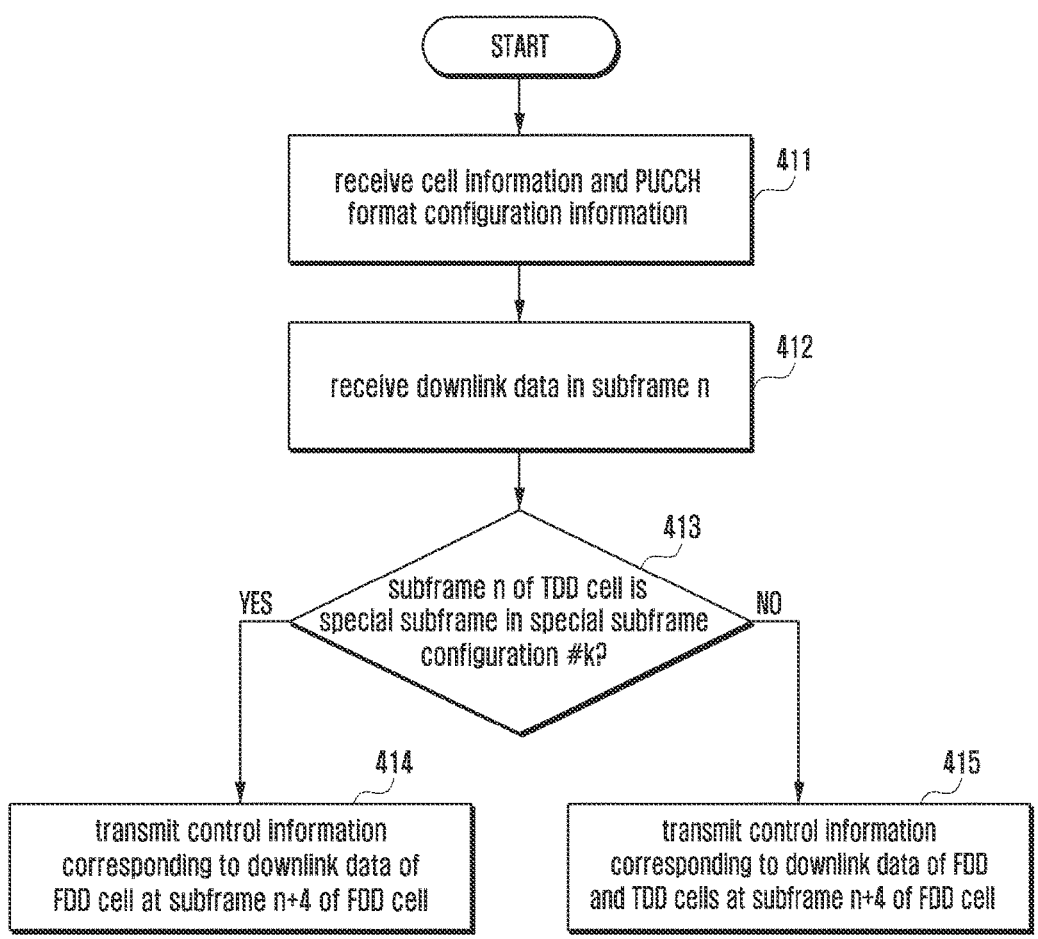

FIGS. 4A and 4B are flowcharts illustrating the operations of the eNB and the UE according to various embodiments of the present disclosure.

Referring to FIGS. 4A and 4B, descriptions are made of the operations of the eNB and the UE for applying the UL control channel formats in transmitting the UL control channel corresponding to the DL data of the FDD and TDD cells according to the embodiments of the present disclosure with reference to the respective flowcharts.

First, the operation of the eNB is described with reference to FIG. 4A. The eNB sends the UE the information on the FDD cell (PCell) and the TDD cell (SCell) and the PUCCH format configuration (PUCCH format 3 or PUCCH format 1b with channel selection) for use at the UE in transmitting the UL control information corresponding to the DL data through the two cells. The information on the FDD and TDD cells may be the UL and DL frequency information of the FDD cell or the UL-DL configuration information and special subframe configuration information of the TDD cell. The information on the FDD and TDD cells may be transmitted to the UE through a system information or higher layer information.

The eNB schedules the DL data for the UE in the FDD and TDD cells in the subframe #n at operation 402. Next, the eNB determines whether the subframe #n is the special subframe in the special subframe configuration #k for the TDD cell at operation 403. The k is the index of the special subframe configuration with DwPTS of 3 OFDM symbols so as not to transmit PDSCH; and if the normal cyclic prefix is used in DL, k is 0 or 5 and, otherwise if the extended cyclic prefix is used in DL, k is 0 or 4. If the subframe of the TDD cell is the special subframe in the special subframe configuration #k, the eNB receives the control information corresponding to the DL data of the FDD cell at the subframe #(n+4) of the FDD cell at operation 404. At this time, if the eNB has transmitted the configuration information indicating the use of the PUCCH format 1b with channel selection at operation 401, it receives only the control information corresponding to the DL data of the FDD cell under the assumption of the PUCCH format 1a/1b. If the eNB has determined not to schedule the DL data in the FDD cell in the subframe #n at operation 402, it may not receive the control information corresponding to the DL data of the FDD cell at the subframe #(n+4) of the FDD cell.

If the subframe of the TDD cell is not the special subframe in the special subframe configuration #k at operation 403, the eNB receives the control information corresponding to the DL data of the FDD cell and the control information corresponding to the DL data of the TDD cell together at operation 405. At this time, if the eNB has transmitted the configuration information indicating the use of the PUCCH format 1b with channel selection to the UE at operation 401, it receives the control information corresponding to the DL data of the FDD cell and the control information corresponding to the DL data of the TDD cell together under the assumption of the PUCCH format 1b with channel selection. If the eNB has transmitted the configuration information indicating the UEs of the PUCCH format 3 to the UE at operation 401, it receives both the control information corresponding to DL data of the FDD and TDD cells under the assumption of the PUCCH format 3 to which the HARQ-ACK payload sizes of both the FDD and TDD cells are applied.

Next, the operation of the UE is described with reference to FIG. 4B.

The UE receives the information on the FDD cell (PCell) and the TDD cell (SCell) and the PUCCH format configuration (PUCCH format 3 or PUCCH format 1b with channel selection) for use at the UE in transmitting the UL control information corresponding to the DL data through the two cells from the eNB. The information on the FDD and TDD cells may be the UL and DL frequency information of the FDD cell or the UL-DL configuration information and special subframe configuration information of the TDD cell. The information on the FDD and TDD cells is received through a system information or higher layer information. The UE receives the DL data of the FDD and TDD cells from the eNB at the subframe #n at operation 412. Next, the UE determines whether the subframe #n of the TDD cell is the special subframe in the special subframe configuration #k at operation 413. The k is the index of the special subframe configuration with DwPTS of 3 OFDM symbols so as not to transmit PDSCH; and if the normal cyclic prefix is used in DL, k is 0 or 5 and, otherwise if the extended cyclic prefix is used in DL, k is 0 or 4. The UE can check whether the DL cyclic prefix of the TDD cell is the normal cyclic prefix or the extended cyclic prefix by decoding the synchronization signal of the TDD cell before or after receiving the information on the cells and PUCCH formation configuration at operation 411.

If the subframe of the TDD cell is the special subframe in the special subframe configuration #k, the UE transmits the control information corresponding to the DL data of the FDD cell at the subframe #(n+4) of the FDD cell at operation 413. At this time, if the UE has received the configuration information indicating the use of the PUCCH format 1b with channel selection from the eNB at operation 411, it transmits only the control information corresponding to the DL data of the FDD cell in the PUCCH format 1a/1b instead of the PUCCH format 1b with channel selection as the configured PUCCH format. If the UE has received the configuration information indicating the use of the PUCCH format 3 from the eNB at operation 411, the UE transmits only the control information corresponding to the DL data of the FDD cell in the PUCCH format 3 to which the HARQ-ACK payload size is applied instead of the PUCCH format 3 to which both the HARQ-ACK payload sizes of the FDD and TDD cells are applied. If the UE has not received the DL data of the FDD cell at subframe #n at operation 412, it may not transmit the control information corresponding to the DL data of the FDD cell at subframe #(n+4) of the FDD cell at operation 414.

If the subframe of the TDD cell is the special subframe in the special subframe configuration #k at operation 413, the UE transmits the control information corresponding to the DL data of the FDD cell at subframe #(n+4) at operation 414. At this time, if the configuration information indicating the use of PUCCH format 1b with channel selection has been received from the eNB at operation 411, the UE transmits the control information corresponding to the DL data of the FDD cell using the PUCCH format 1a/1b. If the configuration information indicating the use of PUCCH format 3 has been received from the eNB at operation 411, the UE transmits only the control information corresponding to the DL data of the FDD cell, instead of all the control information corresponding to the DL data of the FDD and TDD cells to which the HARQ-ACK payload sizes of both the FDD and TDD cells are applied, in the PUCCH format 3. If it fails to receive the DL data of the FDD cell at subframe #n at operation 412, the UE may not transmit the control information corresponding to the DL data of the FDD cell at #(n+4) of the FDD cell at operation 414.

If the subframe of the TDD cell is not the special subframe in the special subframe configuration #k at operation 413, the UE transmits the control information corresponding to the DL data of the FDD cell and the control information corresponding to the DL data of the TDD cell together at subframe #(n+4) at operation 415. At this time, if the configuration information indicating the use of the PUCCH format 1b with channel selection has been received from the eNB at operation 411, the UE transmits the control information corresponding to the DL data of the FDD cell and the control information corresponding to the DL data of the TDD cell in the PUCCH format 1b with channel selection. If the configuration information indicating the use of the PUCCH format 3 has been received from the eNB at operation 411, the UE transmits all the control information corresponding to the DL data of the FDD and TDD cells in the PUCCH format 3 to which the HARQ-ACK payload sizes of both the FDD and TDD cells are applied.

Figure 5:
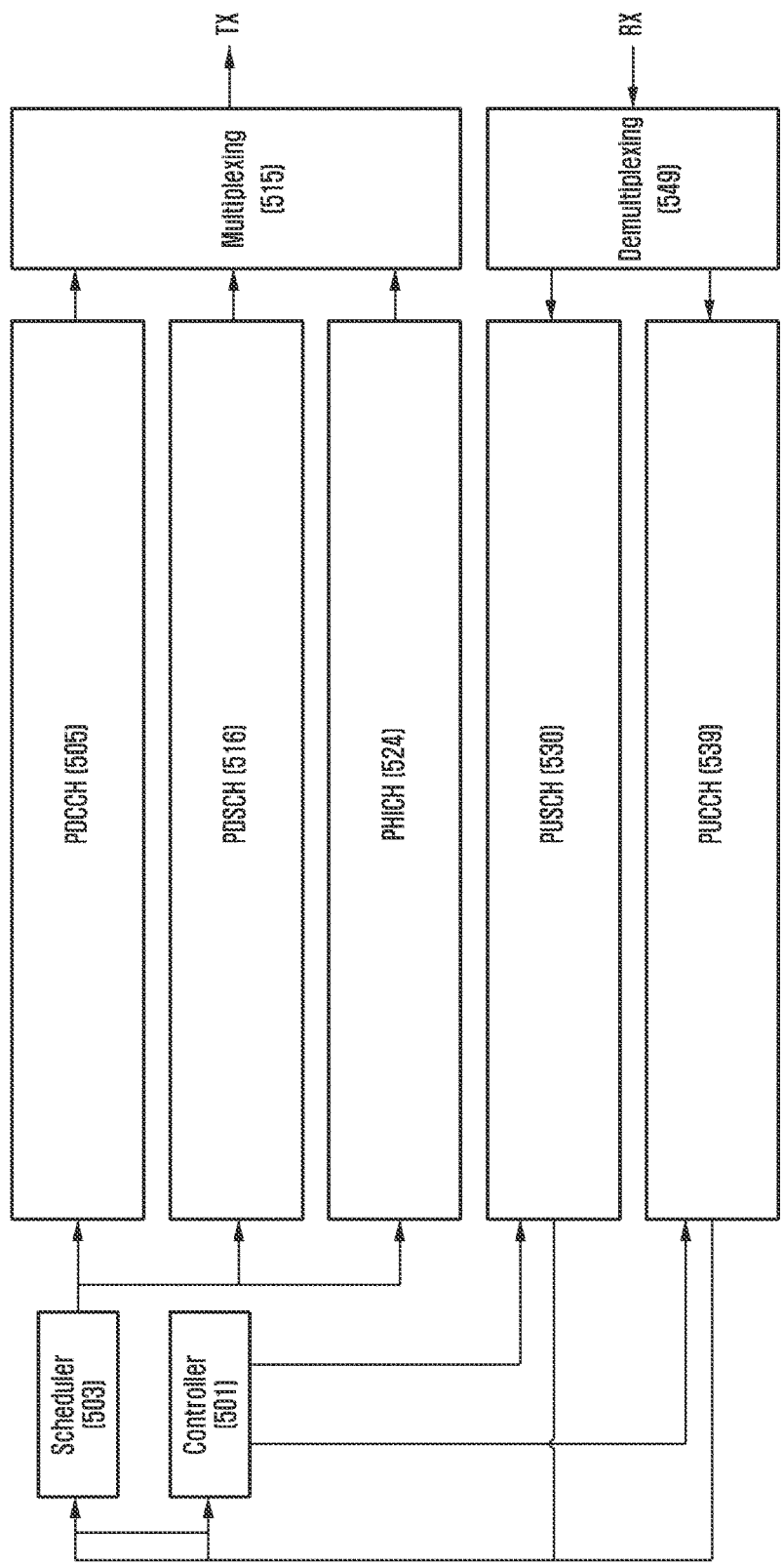
FIG. 5 is a diagram illustrating an eNB apparatus according to an embodiment of the present disclosure.

FIG. 5 is a diagram illustrating an eNB apparatus according to an embodiment of the present disclosure.

Referring to FIG. 5, the eNB apparatus includes a transmitter having a PDCCH block 505, a PDSCH block 516, a physical HARQ indicator channel (PHICH) block 524, and a multiplexer 515; a receiver having a PUSCH block 530, a PUCCH block 539, and a demultiplexer 549; a controller 501 controlling the PUCCH transmission format, and a scheduler 503.

Here, the DL/UL HARQ transmission/reception timing includes the PUCCH transmission timing corresponding to the PUSCH transmission, and the PUCCH transmission formats include PUCCH format 1b with channel selection, PUCCH format 3, and PUCCH format 1a/1b. There may be multiple transmitters and receivers (excluding PUCCH block) for transmission/reception through multiple cells, the description is made under the assumption that there are one transmitter and one receiver for explanation convenience.

The controller 501 which controls DL/UL HARQ-ACK transmission/reception and determines the PUCCH transmission cell adjusts the timing relationships among the physical channels for the use to be scheduled based on the data amount to be transmitted to the UE and the resource amount available in the system and notifies the adjustment result to the scheduler 503, PDCCH block 505, PDSCH block 516, PHICH block 524, PUSCH block 530, and PUCCH block 539. The DL/UL HARQ-ACK transmission/reception timing and PUCCH transmission cell are determined according to the method described in the above embodiments.

The PDCCH block 505 configures the control information under the control of the scheduler 503, and the control information is multiplexed with other signals at the multiplexer 515.

The PDSCH block 516 generates data under the control of the scheduler 503, and the data are multiplexed with other signals at the multiplexer 515.

The PHICH block 524 generates HARQ ACK/negative ACK (NACK) corresponding to the PUSCH received from the UE under the control of the scheduler 503. The HARQ ACK/NACK is multiplexed with other signals at the multiplexer 515.

The multiplexed signals are processed into an OFDM signal so as to be transmitted to the UE.

The PUSCH block 530 of the receiver acquires PUSCH data from the received signal. It notifies the scheduler 503 of the presence/absence of error in the decoding result of the PUSCH data to adjust the DL HARQ ACK/NACK generation and sends the information on the presence/absence of error in the decoding result to the controller 501 which controls the DL/UL HARQ-ACK transmission/reception timing so as to adjust the DL HARQ ACK/NACK transmission timing.

The PUCCH block 539 acquires UL ACK/NACK or channel quality indicator (CQI) from the signal transmitted by the UE in the PUCCH transmission cell according to the DL/UL HARQ-ACK transmission/reception timing. The acquired UL ACK/NACK or CQI is sent to the scheduler 503 for use in determining whether to retransmit PDSCH and modulation and coding scheme (MCS). The acquired UL ACK/NACK is sent to the controller 501 for use in adjusting the PDSCH transmission timing.

Figure 6:
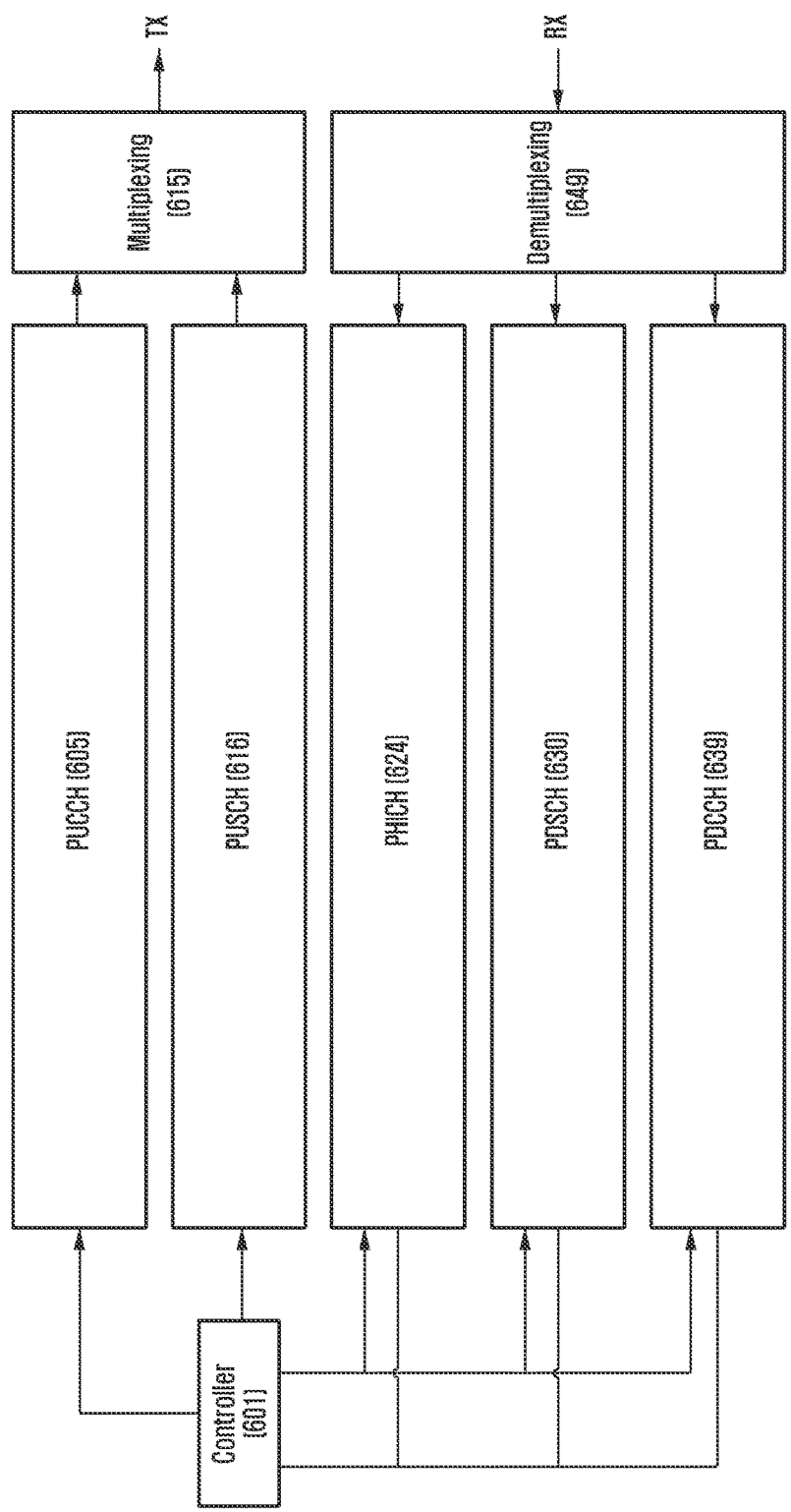
FIG. 6 is a diagram illustrating the UE apparatus according to an embodiment of the present disclosure.

FIG. 6 is a diagram illustrating the UE apparatus according to an embodiment of the present disclosure.

Referring to FIG. 6, the UE includes a transmitter having a PUCCH block 605, a PUSCH block 616, and a multiplexer 615; a receiver having a PHICH block 624, a PDSCH block 630, a PDCCH block 639, and a demultiplexer 649; and a controller for determining the PUCCH transmission cell by receiving DL data from the two eNBs according to the present disclosure. Although there are a plurality of transmitters and receivers (excluding the PUCCH block) for communication with the two eNBs through a plurality of cells, the description is made under the assumption that there are one transmitter and one receiver for explanation convenience.

The controller 601 which determines the PUCCH transmission cell and whether to perform PUCCH transmission according to the present disclosure notifies the PUCCH block 605, PDSCH block 630, and PDCCH block 639 of the eNB and the cell for receiving PDCCH in self-scheduling or cross carrier scheduling based on the downlink control information (DCI) received from the eNB. The PUCCH transmission cell is determined according to the method described in the various embodiments of the present disclosure.

The PUCCH block 605 configures HARQ ACK/NACK or CQI into uplink control information (UCI) under the control of the controller 601 which controls storing DL data in the soft buffer, and the HARQ ACK/NACK or CQI is multiplexed with other signals at the multiplexer 615 and then transmitted through the PUCCH transmission cell determined according to the present disclosure.

The PUSCH block 616 extracts data to be transmitted, and the extracted data are multiplexed with other signals at the multiplexer 615.

The multiplexed signals are processed into the single carrier FDMA (SC-FDMA) signal so as to be transmitted to the eNB.

The PHICH block 624 of the receiver separates the PHICH signal from the signal transmitted by the eNB according to the DL/UL HARQ-ACK transmission/reception timing by means of the demultiplexer 649 and then acquires HARQ ACK/NACK corresponding to the PUSCH.

The PDSCH block 630 separates the PDSCH signal from the signal transmitted by the eNB through the demultiplexer 649, acquires PDSCH data, and notifies the PUCCH block 605 of the presence/absence of error in the decoding result to generate UL HARQ ACK/NACK and sends the presence/absence of error in the decoding result to the controller 601 to adjust the timing for transmitting UL HARQ ACK/NACK. The PDCCH block 639 separates the PDCCH signal through the demultiplexer 649 and performs DCI format decoding to acquire DCI from the decoded signal.

According to the present disclosure, it is possible to transmit/receive data through the cells operating in the different duplex modes simultaneously and to use UL control format optimized for UL control channel transmission, resulting in improvement of UL resource utilization efficiency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a communication system, the method comprising:
   receiving configuration information including information on a special subframe configuration;
   receiving information on an uplink control channel format indicating that a first format is configured for the terminal;
   receiving downlink data on at least one of a first subframe of a primary cell or the first subframe of a secondary cell;
   identifying, according to the first subframe of the secondary cell being a special subframe, an uplink control channel format for feedback information corresponding to the downlink data as the first format or a second format based on whether the first subframe of the secondary cell is one of a special subframe of configurations 0 or 5 with a normal cyclic prefix (CP) or a special subframe of configurations 0 or 4 with an extended CP; and
   transmitting the feedback information corresponding to the downlink data on a second subframe of the primary cell based on the identified uplink control channel format.

2. The method of claim 1, wherein the uplink control channel format for the feedback information is identified as the second format according to the first subframe of the secondary cell being the special subframe of configurations 0 and 5 with the normal CP or the special subframe of configurations 0 and 4 with the extended CP.

3. The method of claim 1,
   wherein the first format is a physical uplink control channel (PUCCH) format 1b with channel selection, and
   wherein the second format is a PUCCH format 1a/1b.

4. The method of claim 1, further comprising:
   receiving information on the uplink control channel format indicating that a third format is configured for the terminal;
   receiving downlink data on a third subframe;
   identifying a number of bits for feedback information corresponding to the downlink data based on a number of configured serving cells with the third subframe configured as a downlink subframe or a special subframe except the special subframe of configurations 0 and 5 with the normal CP or of configurations 0 and 4 with the extended CP; and
   transmitting the feedback information using the third format based on the identified number of bits on a fourth subframe of the primary cell,
   wherein the third format is a PUCCH format 3.

5. The method of claim 4, wherein the number of bits for the feedback information is determined based on at least one of a downlink transmission mode configured for the primary cell or a downlink transmission mode configured for the secondary cell.

6. A method by a base station in a communication system, the method comprising:
   transmitting configuration information including information on a special subframe configuration for a terminal;
   transmitting information on an uplink control channel format indicating that a first format is configured for the terminal;
   transmitting downlink data on at least one of a first subframe of a primary cell or the first subframe of a secondary cell;
   identifying, according to the first subframe of the secondary cell being a special subframe, an uplink control channel format for feedback information corresponding to the downlink data as the first format or a second format based on whether the first subframe of the secondary cell is one of a special subframe of configurations 0 or 5 with a normal cyclic prefix (CP) or a special subframe of configurations 0 or 4 with an extended CP; and
   receiving the feedback information corresponding to the downlink data on a second subframe of the primary cell based on the identified uplink control channel format.

7. The method of claim 6, wherein the uplink control channel format for the feedback information is identified as the second format according to the first subframe of the secondary cell being the special subframe of configurations 0 and 5 with the normal CP or the special subframe of configurations 0 and 4 with the extended CP.

8. The method of claim 6,
   wherein the first format is a physical uplink control channel (PUCCH) format 1b with channel selection, and
   wherein the second format comprises is a PUCCH format 1a/1b.

9. The method of claim 6, further comprising:
   transmitting information on the uplink control channel format indicating that a third format is configured for the terminal;
   transmitting downlink data on a third subframe;
   identifying a number of bits for feedback information corresponding to the downlink data based on a number of configured serving cells with the third subframe configured as a downlink subframe or a special subframe except the special subframe of configurations 0 and 5 with the normal CP or of configurations 0 and 4 with the extended CP; and
   receiving the feedback information using the third format based on the identified number of bits on a fourth subframe of the primary cell,
   wherein the third format is a PUCCH format 3.

10. The method of claim 9, wherein the number of bits for the feedback information is determined based on at least one of a downlink transmission mode configured for the primary cell or a downlink transmission mode configured for the secondary cell.

11. A terminal in a communication system, the terminal comprising:
   a transceiver; and
   at least one processor coupled with the transceiver and configured to:
      receive configuration information including information on a special subframe configuration,
      receive information on an uplink control channel format indicating that a first format is configured for the terminal,
      receive downlink data on at least one of a first subframe of a primary cell or the first subframe of a secondary cell,
      identify, if the first subframe of the secondary cell is a special subframe, an uplink control channel format for feedback information corresponding to the downlink data as the first format or a second format based on whether the first subframe of the secondary cell is one of a special subframe of configurations 0 or 5 with a normal cyclic prefix (CP) or a special subframe of configurations 0 or 4 with an extended CP, and
      transmit the feedback information corresponding to the downlink data on a second subframe of the primary cell based on the identified uplink control channel format.

12. The terminal of claim 11, wherein the uplink control channel format for the feedback information is identified as the second format, if the first subframe of the secondary cell is the special subframe of configurations 0 and 5 with the normal CP or the special subframe of configurations 0 and 4 with the extended CP.

13. The terminal of claim 11,
   wherein the first format is a physical uplink control channel (PUCCH) format 1b with channel selection, and
   wherein the second format is a PUCCH format 1a/1b.

14. The terminal of claim 11,
   wherein the at least one processor is further configured to:
      receive information on the uplink control channel format indicating that a third format is configured for the terminal,
      receive downlink data on a third subframe,
      identify a number of bits for feedback information corresponding to the downlink data based on a number of configured serving cells with the third subframe configured as a downlink subframe or a special subframe except the special subframe of configurations 0 and 5 with the normal CP or of configurations 0 and 4 with the extended CP, and
      transmit the feedback information using the third format based on the identified number of bits on a fourth subframe of the primary cell, and wherein the third format is a PUCCH format 3.

15. The terminal of claim 14, wherein the number of bits for the feedback information is determined based on at least one of a downlink transmission mode configured for the primary cell or a downlink transmission mode configured for the secondary cell.

16. A base station in a communication system, the base station comprising:
   a transceiver; and
   at least one processor coupled with the transceiver and configured to:
      transmit configuration information including information on a special subframe configuration for a terminal,
      transmit information on an uplink control channel format indicating that a first format is configured for the terminal,
      transmit downlink data on at least one of a first subframe of a primary cell or the first subframe of a secondary cell, identify, if the first subframe of the secondary cell is a special subframe, an uplink control channel format for feedback information corresponding to the downlink data as the first format or a second format based on whether the first subframe of the secondary cell is one of a special subframe of configurations 0 or 5 with a normal cyclic prefix (CP) or a special subframe of configurations 0 or 4 with an extended CP, and receive the feedback information corresponding to the downlink data on a second subframe of the primary cell based on the identified uplink control channel format.

17. The base station of claim 16, wherein the uplink control channel format for the feedback information is identified as the second format, if the first subframe of the secondary cell is the special subframe of configurations 0 and 5 with the normal CP or the special subframe of configurations 0 and 4 with the extended CP.

18. The base station of claim 16,
wherein the first format is a physical uplink control channel (PUCCH) format 1b with channel selection, and
wherein the second format comprises is a PUCCH format 1a/1b.

19. The base station of claim 16,
wherein the at least one processor is further configured to:
transmit information on the uplink control channel format indicating that a third format is configured for the terminal,
transmit downlink data on a third subframe,
identify a number of bits for feedback information corresponding to the downlink data based on a number of configured serving cells with the third subframe configured as a downlink subframe or a special subframe except the special subframe of configurations 0 and 5 with the normal CP or of configurations 0 and 4 with the extended CP, and
receive the feedback information using the third format based on the identified number of bits on a fourth subframe of the primary cell, and
wherein the third format is a PUCCH format 3.

20. The base station of claim 19, wherein the number of bits for the feedback information is determined based on at least one of a downlink transmission mode configured for the primary cell or a downlink transmission mode configured for the secondary cell.

* * * * *